United States Patent [19]

Rodgers

[11] 3,813,949

[45] June 4, 1974

[54] LIGHT ACTUATED SOLID STATE PICKOFF

[75] Inventor: Aubrey Rodgers, Huntsville, Ala.

[73] Assignee: The United States of America as represented by the Secretary of the Army, Washington, D.C.

[22] Filed: Feb. 2, 1973

[21] Appl. No.: 328,988

[52] U.S. Cl............................................. 74/5.6 A
[51] Int. Cl........................................... G01c 19/28
[58] Field of Search.................. 74/5.6 A; 33/363 K; 250/215

[56] References Cited
UNITED STATES PATENTS
2,959,060  11/1960  Kunz................................. 74/5.6 A
3,084,560  4/1963  Cleveland.......................... 74/5.6 A
3,501,967  3/1970  DeCotiis............................ 74/5.6 A
3,732,739  5/1973  Catford et al...................... 74/5.6 A Primary Examiner—Manuel A. Antonakas
Attorney, Agent, or Firm—Edward J. Kelly; Herbert Berl; James T. Deaton

[57] ABSTRACT

A light actuated two degree of freedom gyro in which light sources and light position sensors are mounted on the stator in facing relation with a portion of the rotor blocking the light source to the light position sensors as the rotor deviates from a predetermined position. As the rotor drifts from the predetermined position, more or less light is sensed by the light sensors which in turn causes electrical signals to be generated. The generated signals are then used to control mechanism to cause the stator to be adjusted relative to the rotor.

4 Claims, 4 Drawing Figures

LIGHT ACTUATED SOLID STATE PICKOFF

CROSS REFERENCE TO RELATED APPLICATION

This application is related to co-pending application Ser. No. 248,143, filed Apr. 27, 1972.

BACKGROUND OF THE INVENTION

In the past, light actuated solid state pickoffs have been used in which the arrangement included a light source, slit mask, mirrored rotor surface, and rotor reflected light onto photosensitive sensor. In systems of this type, the position of the reflected slit light beam on the sensor is a measure of the angular position of the gyro rotor relative to the inertial spaced fixed rotor. Some of the disadvantages of a pickoff system of this type include precision design requirement and geometric arrangement, critical machine parts, critical component alignment, and light sensitivity in relation to light intensity variations. A system of the type referenced above is of the type disclosed in U.S. Pat. No. 3,628,385. As can be seen, a much simplified solid state pickoff arrangement would be advantageous if the solid state pickoff could be defined in geometric arrangement such that the number of critical machine parts could be reduced or eliminated, the number of critical component alignment parts could be reduced, and if lower light intensity for equivalent performance could be used.

Therefore, it is an object of this invention to provide a pickoff arrangement for a gyro in which fewer precision parts are required.

Another object of this invention is to provide a pickoff system for a gyro that utilizes solid state elements and is less sensitive to light intensity variations than that of previous designs.

Further object of this invention is to provide a gyro pickoff arrangement in which less critical component alignment is required.

SUMMARY OF THE INVENTION

In accordance with this invention, a light actuated solid state pickoff is provided in which the light sources and the light sensors are mounted on the stator portion of the gyro with the rotor edge of the gyro masking a predetermined area of the sensor and exposing the remaining area of the sensor to the light from the light source. The light sources and the sensors are mounted 90° apart on the stator housing to allow adjustments of two degrees of freedom of the gyro. The outputs from the sensors are fed into conventional bridge type circuits that provide signals that are proportional to the angular displacement of the rotor relative to the stator. These proportional signals are fed into conventional amplifier circuits that produce signals for actuating a control system that adjusts the stator relative to the rotor of the gyro through a missile body.

DESCRIPTION OF THE PREFERRED EMBODIMENT

Figure 1:
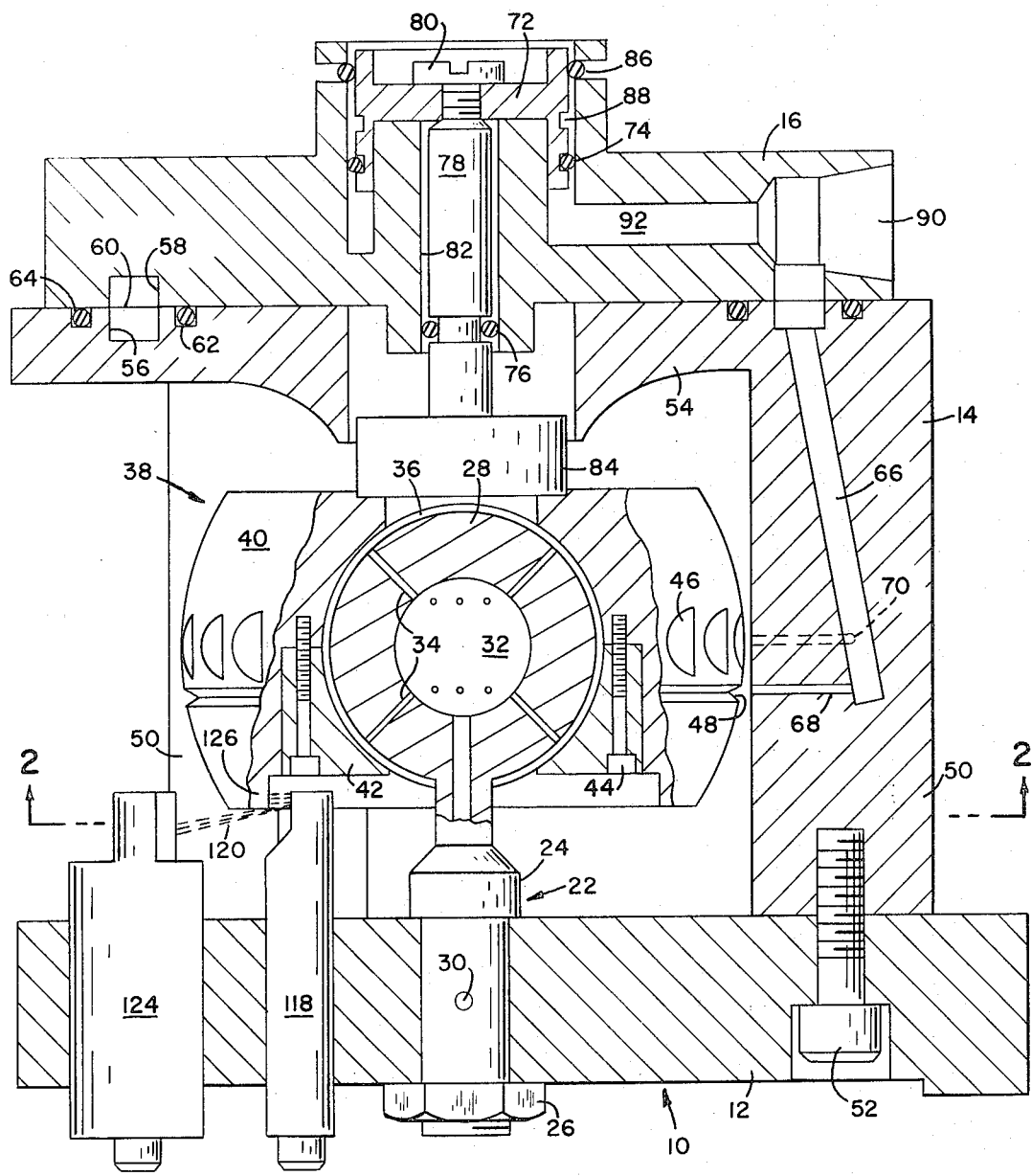
FIG. 1 is a sectional view of a gyro incorporating the pickoffs according to this invention, FIG. 2 as a sectional view along line 2—2 of FIG. 1.
Figure 2:
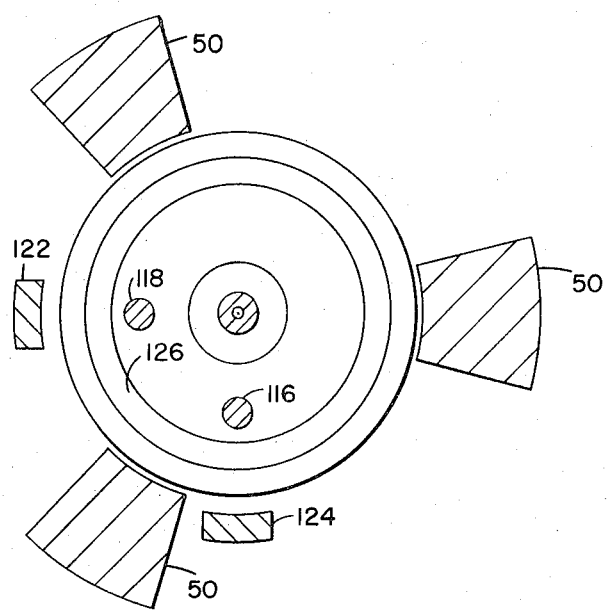

Referring now to FIG. 1, a gyro 10 for incorporation of the pickoffs according to this invention is illustrated. It is to be understood that gyro 10 is only illustrative of a gyro of the type that can be used with the pickoffs of this invention. Obviously, the pickoffs of this invention could be used with gyros that are rotated by means other than fluid.

Gyro 10 includes a base 12, an intermediate section 14 and an upper section 16. Air bearing support 22 is mounted on base 12 by flange 24 and bolt securing means 26. Air bearing support 22 has a ball shaped member 28 that is supplied fluid from inlet 30 to chamber 32 of the ball and then through ports 34 to air bearing space 36 that is defined between ball member 28 and rotor 38. Rotor 38 has two sections 40 and 42 that are secured together by conventional securing means such as screws 44. Rotor member 40 has spin up buckets 46 in the outer periphery thereof and V shaped groove 48 about the circumference thereof. The V or V shaped groove 48 should form an approximately 60° angle.

Intermediate section 14 has three legs 50 that are connected to base 12 such as by screw means 52. Each of legs 50 is connected to an upper circumferential section 54 that has an upper circumferential groove 56. Upper section 16 has a circumferential groove 58 that forms a chamber 60 with circumferential groove 56. O-rings 62 and 64 seal between members 54 and 16. Passage 66 in each of legs 50 communicates from chamber 60 to port 68 for caging groove 48 and to passage 70 for spin up buckets 46.

Upper housing 16 has pistons 72 mounted therein. O-ring 74 seals between piston 72 and housing 16 and O-ring 76 seals between stem 78 that is connected to piston 72 by securing means 80 in housing 16 that has bore 82 therein. Caging member 84 is integrally connected to stem 78 and maintains rotor 38 in caged position until time for spin up of rotor 38. Detent spring 86 is adapted to engage groove 88 of piston 72 and maintain caging member 84 in a retracted position. Inlet 90 is in communication with chamber 60 and passage 92 that communicates with piston 72.

The pickoff system according to this invention includes light sources 116 and 118 that transmit light rays 120 to photoconductive sensors 122 and 124. Rotor edge 126 masks a predetermined area of each photoconductive sensor 122 and 124 and exposes the remaining area of each photoconductive sensor 122 and 124 to the light rays from light source 116 or 118.

Figure 3:
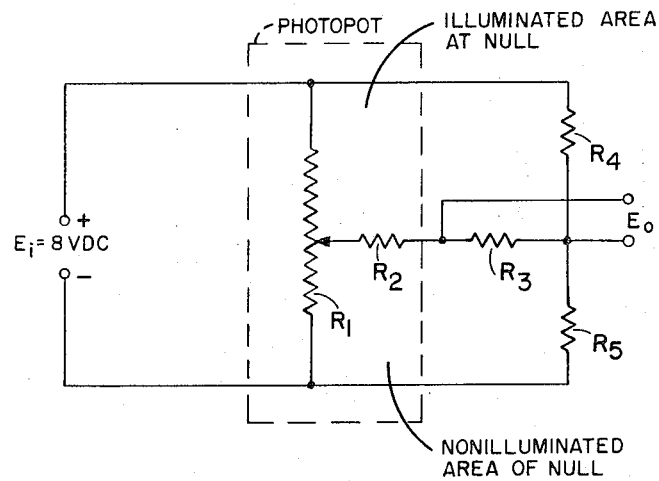
FIG. 3 is a circuit diagram of a bridge circuit.

Excitation voltage to light sources 116 and 118 (not shown) and excitation voltage to photoconductive sensors 122 and 124, if required, energizes the pickoff. Radiation of light rays 120 from the light sources falling on the predetermined photoconductive sensor areas 122 or 124 produce electrical signals that are read out in respective bridge circuits for each photoconductive sensor 122 and 124. A conventional bridge circuit incorporating the photoconductive sensor is illustrated in FIG. 3 in which the photoconductive sensor 122 or 124 is illustrated as resistor R1 and is connected in bridge circuit with resistors R2, R3, R4 and R5 as illustrated so that when a voltage of, for example, 8 volts DC is applied across leads connected to resistor R1, a predetermined voltage will appear at outputs $E_O$. The output at $E_0$ can be used directly or through amplifier circuits to control control means of a missile.

Figure 4:
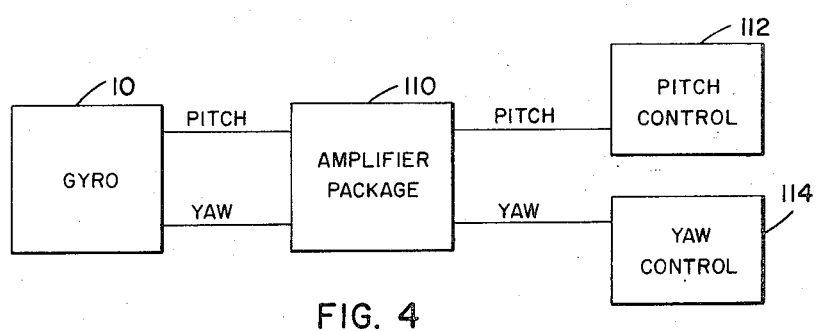
FIG. 4 is a schematic block diagram of a control system utilizing the signals from the pickoffs.

FIG. 4 depicts in block diagram form signals from the gyro that are derived from photoconductive sensors 122 and 124 as yaw or pitch signals that are fed into amplifier package 110 to produce pitch and yaw output for controlling pitch control 112 and yaw control 114. Amplifier package 110 contains bridge circuits of the type illustrated in FIG. 3.

Light sources 116 and 118 according to this invention can be chosen from conventional light source elements such as a 250 millilumens micro-miniature lamp or a light emitting diode. Photoconductive sensors 122 and 124 according to this invention can be chosen from conventional elements such as silicon photo detector sensors or cadmium selenide or cadmium sulfide photoconductive sensors.

In operation, low pressure fluid is supplied through inlet port 30 to the air bearing space to support rotor 38 on a bearing of air and simultaneously high pressure fluid is supplied at inlet port 90 to actuate piston 72 and uncage rotor 38 and at the same time supply fluid through ports 70 to buckets 46 to cause rotor 38 to be brought up to a predetermined speed and caged into a predetermined caged position. For a more detailed explanation of the operation of the gyro, see co-pending application Ser. No. 284,143. As rotor 38 and base 12 of the stator housing move relative to each other, rotor edge 126 blocks more or less of light rays 120 from light sources 116 and 118 onto photoconductive sensors 122 and 124 respectively. The light striking photoconductive sensors 122 and 124 causes electrical signals to be produced as yaw and pitch signals. The yaw and pitch signals are processed in amplifier package 110 that in turn controls pitch control 112 and yaw control 114 to return the missile body axis into alignment with the rotor spin axis. As can be seen, analog signals from photosensitive elements 122 and 124 generate electrical signals proportional to the misalignment between the stator or missile body axis and the gyro spin axis of the rotor. Amplifier package 110 processes and amplifies the analog signals from the gyro into pitch and yaw error signals that control the pitch and yaw controls. The reaction of the missile pitch and yaw control in the form of vanes or reaction valves returns the missile body axis into alignment with the gyro spin axis.

I claim:

1. A light actuated gyro pickoff comprising: a rotor; a stator; air bearing means between mating surfaces of said rotor and said stator and supporting said rotor member for rotation relative to said stator; and light actuated pickoff control means disposed relative to said rotor and stator, said pickoff control means comprising light source means mounted on said stator, photoconductive sensor means mounted on said stator in facing relation to said light source means, and said rotor having a circumferential edge portion that is between said light source means and said photoconductive sensor means to mask an area portion of said photoconductive sensor means relative to said light source means as said rotor and stator are rotating relative to each other in a predetermined caged position, said rotor being mounted relative to said light source means so that as said rotor tilts relative to said stator, more or less light from said light source means will be masked by said circumferential edge portion and thereby vary the amount of said light from said light source means that will fall on said photoconductive sensor means and thereby cause said photoconductive sensor means to produce analog signals.

2. A light actuated gyro pickoff as defined in claim 1, wherein said photoconductive sensor means is connected into an amplifier package that produces signals that actuate control means for adjusting said stator relative to said rotor.

3. A light actuated gyro pickoff as set forth in claim 2, wherein said light source means includes two light sources that are mounted 90° apart on said stator and said photoconductive sensor means includes two photoconductive sensors that are mounted 90° apart and opposite said light sources to produce a two degree of freedom pickoff.

4. A light actuated gyro pickoff as defined in claim 1, wherein said stator includes a base with a bearing support mounted thereon, said air bearing means of said stator being on said bearing support, and said light source means and said photoconductive sensor means being mounted on said base of said stator in spaced relation to said bearing support.

* * * * *